R. S. JOHNSON.
LIQUID MEASURING DEVICE.
APPLICATION FILED FEB. 21, 1914.

1,137,861.

Patented May 4, 1915.
2 SHEETS—SHEET 1.

ATTEST

INVENTOR
Robert S. Johnson
BY Fisher & Moser, ATT'YS

R. S. JOHNSON.
LIQUID MEASURING DEVICE.
APPLICATION FILED FEB. 21, 1914.
1,137,861.
Patented May 4, 1915.
2 SHEETS—SHEET 2.
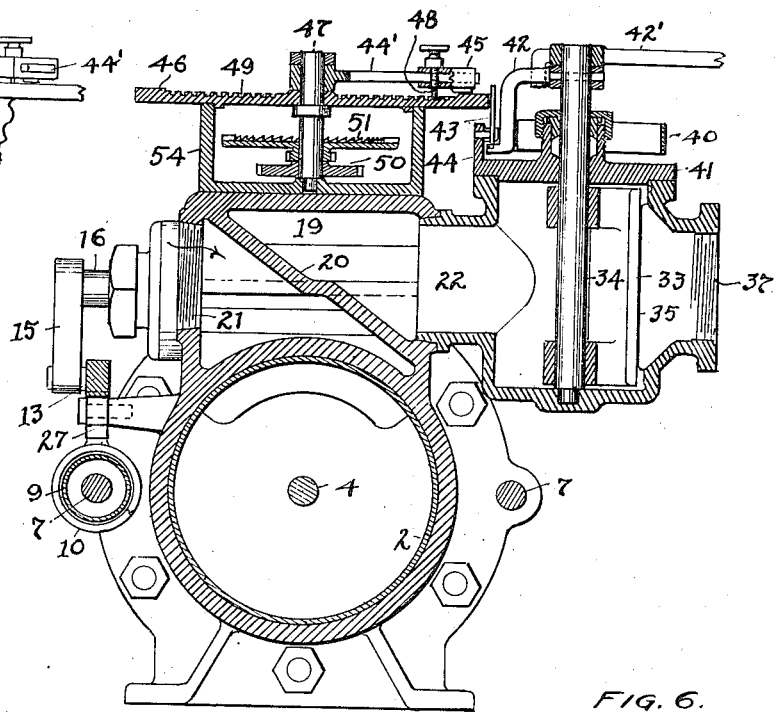
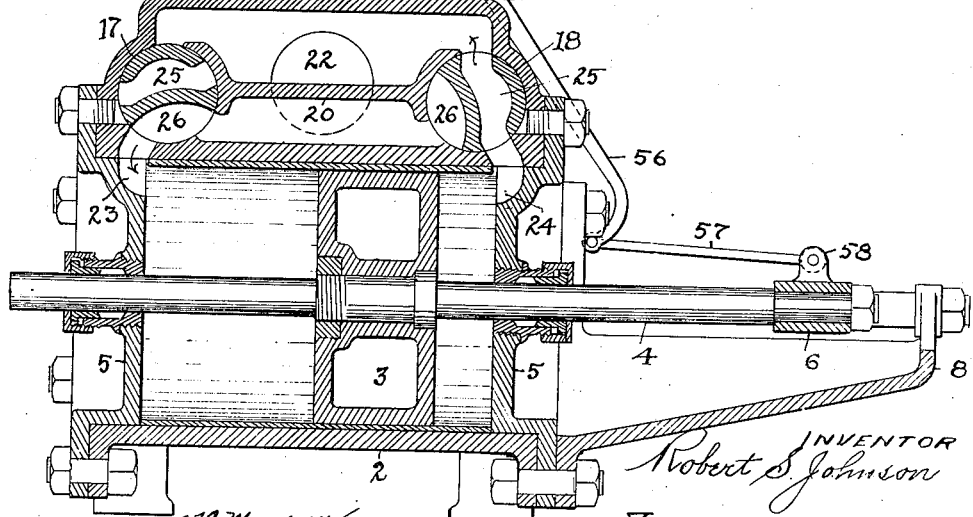
INVENTOR
Robert S. Johnson
BY Fisher & Moser ATT'YS.

UNITED STATES PATENT OFFICE.

ROBERT S. JOHNSON, OF EAST CLEVELAND, OHIO.

LIQUID-MEASURING DEVICE.

1,137,861. Specification of Letters Patent. Patented May 4, 1915.

Application filed February 21, 1914. Serial No. 820,140.

*To all whom it may concern:*

Be it known that I, ROBERT S. JOHNSON, a citizen of the United States, residing at East Cleveland, in the county of Cuyahoga and State of Ohio, have invented certain new and useful Improvements in Liquid-Measuring Devices, of which the following is a specification.

This invention relates to liquid measuring devices, and the invention comprises a construction and arrangement of parts adapted to measure accurately any liquid passing under pressure through a pipe line, all substantially as herein shown and described and more particularly pointed out in the claims.

Figure 1:
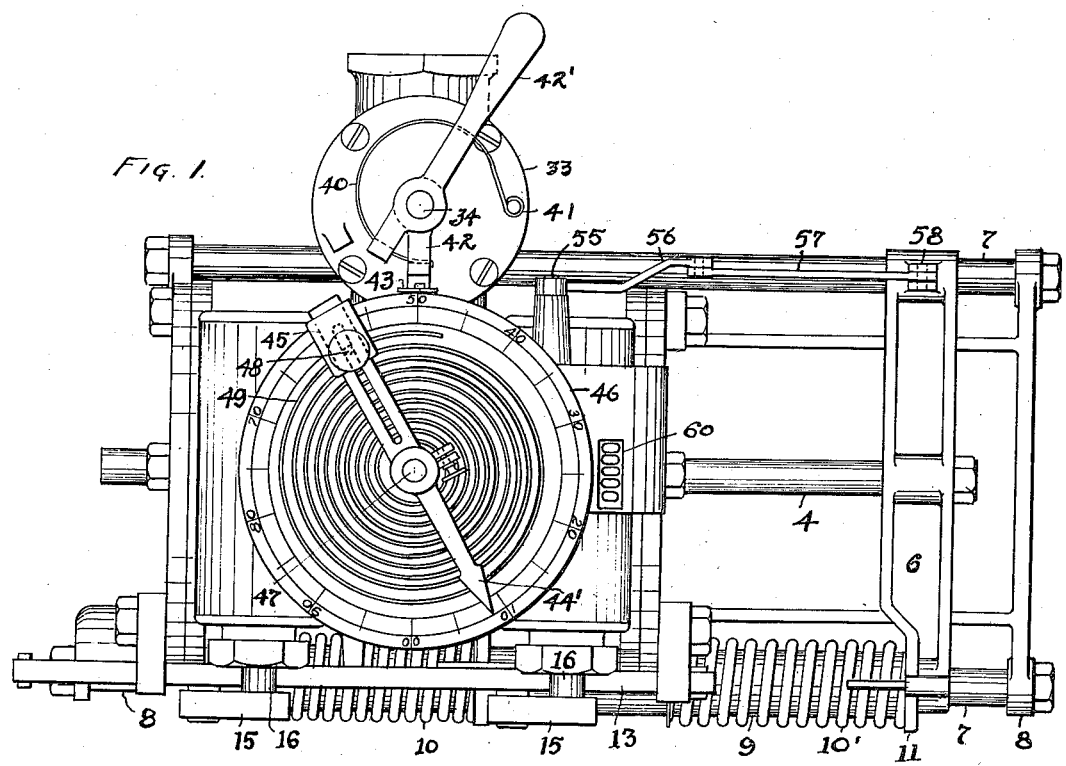
Figure 2:
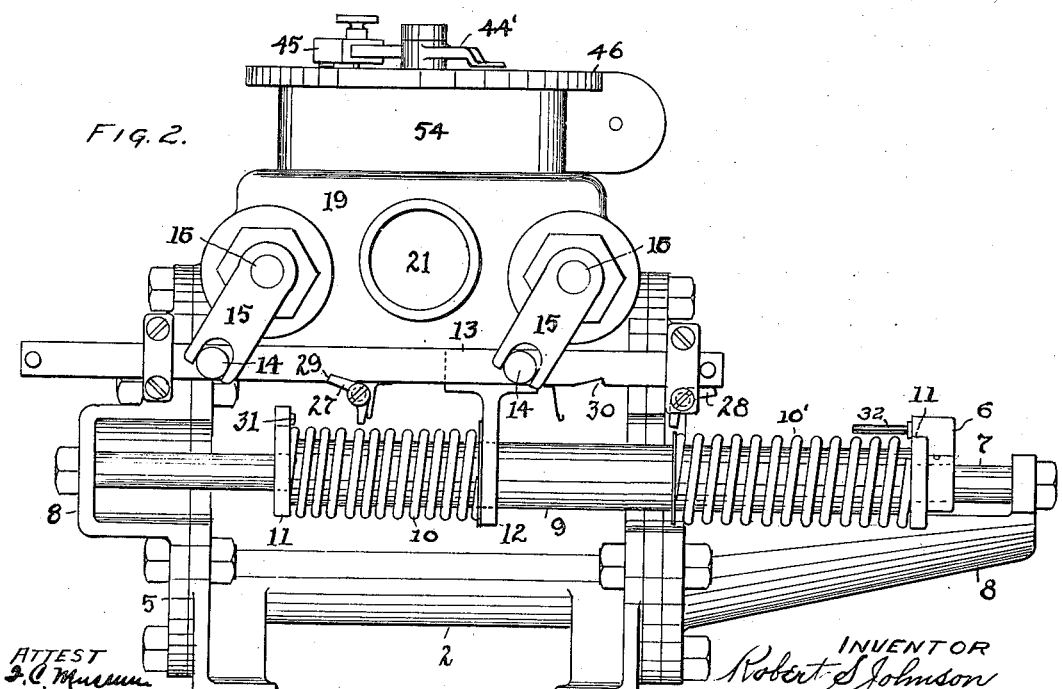

In the accompanying drawings, Figure 1 is a plan view of my improved measuring device, and Fig. 2 is a side view thereof. Fig. 3 is a sectional view vertically through the device on the line of the inlet and outlet ports. Fig. 4 is a detail view of the valve releasing trigger which is engaged by the dial hand. Fig. 5 is a longitudinal section of the device on the line of the piston. Fig. 6 is a cross section of the oscillating valve controlling the outlet port.

The device consists of a cylinder 2 containing a reciprocable piston 3 affixed to a shaft 4 having slidable bearing in the removable cylinder heads 5. A cross head 6 is secured to one outer end of shaft 4, and the extremities of the cross-head are slidably supported on parallel rods 7 secured at their ends to suitable brackets 8 on the cylinder heads 5. Cross-head 6 is provided with an elongated sleeve 9 which slides therewith on one rod 7, and a pair of coiled springs 10—10' are loosely mounted upon said sleeve in abutting engagement with the end shoulders or enlargements 11 thereof. A rigid arm 12 depending from bar 13 is interposed between the two springs, and said bar is slidably supported at the side of the cylinder and has two pins 14 projected laterally therefrom and which are engaged by the slotted fingers 15 on the separate valve stems 16 of the two cylindrical valves 17 and 18 in the ends of the valve chest 19 at the top of the cylinder. A wall 20 extends diagonally across the valve chest and separates the inlet port 21 from the outlet port 22, see Fig. 3, and the valves 17 and 18 are located at the respective ends of said wall opposite the end ducts 23 and 24 of the cylinder, said valves are each provided with two cross passages 25 and 26 for intake and exhaust purposes, and when one valve is set to admit the liquid into the cylinder on one side of the piston the other valve is in position to permit a free discharge of the liquid on the other side of the piston. An end movement of bar 13 places the fingers 15 of the valves in a different angular setting and oscillates the valves accordingly, but said bar is locked against movement at the beginning of the stroke of the piston by one or the other of two spring-pressed dogs, 27 and 28, respectively, when engaged in the notches 29 and 30 in the bottom edge of said bar. In Fig. 2, dog 27 is seated in notch 29 of the bar, and assuming that the movement of the piston and sleeve 9 is to the right under the pressure of the liquid flowing into the cylinder at the left through valve 17, it follows that the spring 10 on sleeve 9 beneath said dog will engage arm 12 and be compressed during the latter part of the stroke of the piston. Dog 27, which is pivotally fixed on the cylinder, will be tripped to release said bar when the projection 31 on the end of the sleeve engages the depending finger of the dog, thereby releasing bar 13 and permitting the compressed spring 10 to exert its stored energy upon arm 12 and therethrough force bar 13 to the right to oscillate the valves 17 and 18 to reverse the movement of the piston. Shifting of bar 13 is instantaneous and at the end of its movement to the right it is locked against a return travel by dog 28 entering notch 30. Consequently, the valves remain set while the piston reverses its travel and carries the cross-head and its sleeve 9 in the same direction until the spring 10' on the sleeve engages arm 12 and is compressed and the bar 13 finally released from dog 28 by engagement of the projection 32 with the depending finger of said dog. Then bar 13 is forced to the left by the spring to place the valves in the set relations seen in the several figures, and the piston is again reversed in its travel. The valve motion is positive and practically instantaneous in its operation and the amount of liquid taken in and expelled from the cylinder at each stroke of the piston is definitely fixed and will not vary.

When the flow of the liquid is cut off, the device immediately ceases to operate, and this result is accomplished by a valve 33 attached at the outlet port 22. Said valve comprises a central stem 34 having a shoe or segment 35 slidably mounted thereon and spring-pressed to seat tightly against the circular wall of the chamber 36 in the valve and adapted to be oscillated to open and close the discharge passage 37 of the valve. This construction of valve is preferred for the reason that the wiping movement of the segment keeps the seating surfaces clean and free from sediment, and sealing effects are positively maintained by reason of the pressure of the liquid upon the inside of the shoe flanges and by the pressure of the spring or springs 38. Valve 33 is also quick-closing, an operation effected by a bow spring 40 which is attached at one of its ends to the top plate 41 of the valve and at its other end to a bent arm 42 pinned to the valve stem. A handle 42' is also used to open the valve, and a trigger or catch member 43 is pivoted upon a post 44 to hook and hold the arm 42 in an open position. Release of said arm and closing of the valve 33 is effected automatically when a predetermined amount of liquid has passed through the device, the means to accomplish this result comprising a rotatable indicator 44' having a contact 45 slidably mounted thereon to engage the upper end of trigger 43 when said indicator approaches its normal place of rest at 0/0 on dial 46, see Fig. 1. When the indicator 44' and its contact 45 is set initially, the pointer is placed opposite any one of the radial indices on the dial with the contact 45 in a relative corresponding position on the slotted end of the indicator, or in other words more or less distant from the indicator axis or shaft 47. Contact 45 carries a thumb screw having a stem 48 which rides within the spiral groove 49 in the top face of dial 46, and a return rotation of the indicator causes an outward travel of the contact 45 by means of said stem 48 until the contact strikes trigger 43 and releases the valve arm 42 to stop the flow of liquid through the device. Rotation of the indicator shaft 47 is effected by a set of meshed gears 50, a ratchet wheel 51, and a pair of pawls 52 and 53, located in a housing 54 beneath dial 46. Said pawls are pivotally connected with an oscillating member or shaft 55 having a lever 56 which is connected by a link 57 with an ear 58 on the reciprocable cross-head 6. A full stroke of the piston is required before reversal thereof occurs, and the amount of liquid discharged is the same at each stroke of the piston in either direction. Consequently, when the indicator and its slidable contact is set in any given position on the dial a predetermined number of strokes of the piston must occur before the valve 33' is closed. Thus the amount of liquid discharged may be accurately predetermined. A computing instrument 60 may also be used to register the total amount of liquid passing through the device and operation thereof may be effected by a link 61 connected to the oscillatory member 55, see Fig. 5.

The indicator is easily and quickly set by hand to any desired position, and when set, valve 33 may be opened by handle 42' to permit the liquid to flow through the device. When the full amount of liquid has passed through the device the contact 45 on the indicator will trip trigger 43 and the bow spring 40 will close the valve instantly. The device is positive in operation, simple in construction and especially adapted to measure oils in pipe lines where it is desirable to place a check on the amount of oil used or to obtain a record for a cost system.

What I claim is:

1. In a measuring device, a cylinder having a piston therein and provided with inlet and outlet ports, oscillatory valves for said ports, means connected with said piston to oscillate said valves intermittently, a valve to control the flow of liquid through said device, and means having operative connection with the piston to effect automatic movement of said valve.

2. In a measuring device, a cylinder, a piston, valves and means to oscillate said valves intermittently comprising a reciprocable bar and locking pawls therefor, a set of springs to actuate said bar, and a reciprocable member to compress said springs and adapted to engage and release said locking pawls.

3. In a measuring device, a cylinder, a piston, valves, a reciprocable bar to oscillate said valves, locking pawls for said bar, a pair of springs to actuate said bar, a reciprocable member to compress said springs and unlock said pawls, and a cross-head for the piston to reciprocate said member.

4. In a measuring device, a cylinder, a piston, valves, valve operating mechanisms, a separate valve to control the passage of a fluid through said device, a rotatable indicator having operative connections with said piston, a contact on said indicator to effect a closing movement of said separate valve, and means to effect an independent movement of said contact upon rotation of said indicator.

5. In a measuring device, a reciprocable piston, a valve, an indicator, means to rotate said indicator upon each stroke of the piston, a slidable contact carried by said indicator, a spiral to move said contact upon a rotative movement of said indicator, and a locking member for said valve, adapted to be released by engagement with said contact.

6. In a measuring device, a piston having a rod and cross-head, a valve, a locking member to hold said valve open, a rotatable indicator, ratchet and gear mechanisms and links and lever operating devices therefor connected with said cross-head, a slidable contact carried by said indicator to release said locking member, and a dial having spiral means to actuate said contact upon a rotative movement of said indicator.

7. In a measuring device, a set of oscillating valves, a piston, means to reverse the movement of said valves at the end of each stroke of the piston, a valve to control the flow of fluid through said device, a locking member to hold said valve open, indicator means capable of variable settings to release said locking device, and operating mechanisms for said indicator means in power connection with said piston.

8. In a measuring device, a piston, oscillatory valves to control the flow of fluid on opposite sides of said piston, in combination with an oscillating valve to control the flow of fluid through said device, comprising a stem, a valve segment carried by said stem, and springs to press said segment to its seat.

9. In a measuring device, a cylinder having a valve chest provided with an oscillating valve at opposite ends thereof, a piston for said cylinder having a rod provided with a cross-head, guides for said cross-head, a sleeve on one of said guides, a pair of coiled springs upon said sleeve, a reciprocable bar having an engaging portion extending between said springs, locking members for said bar adapted to be engaged by portions of said sleeve, and arms for said valves in operating connection with said bar.

In testimony whereof I affix my signature in presence of two witnesses.

ROBERT S. JOHNSON.

Witnesses:
R. B. MOSER,
F. C. HARROLD.